United States Patent
Landgraf et al.

(10) Patent No.: US 8,352,536 B2
(45) Date of Patent: Jan. 8, 2013

(54) INTERFACE BETWEEN A PRODUCTION MANAGEMENT SYSTEM AND AN AUTOMATION SYSTEM

(75) Inventors: Guenther Landgraf, Karlstadt (DE); Mathias Muenzberg, Wuerzburg (DE)

(73) Assignee: Robert Bosch GmbH, Stuttgart (DE)

( * ) Notice: Subject to any disclaimer, the term of this patent is extended or adjusted under 35 U.S.C. 154(b) by 922 days.

(21) Appl. No.: 12/238,718

(22) Filed: Sep. 26, 2008

(65) Prior Publication Data

US 2009/0106345 A1    Apr. 23, 2009

(30) Foreign Application Priority Data

Sep. 26, 2007   (DE) .................. 10 2007 045 926

(51) Int. Cl.
*G06F 15/16*    (2006.01)
(52) U.S. Cl. ............... 709/200; 709/224; 709/249
(58) Field of Classification Search .......... 700/65, 700/108–112; 709/206, 217–219, 223–224, 709/249, 200
See application file for complete search history.

(56) References Cited

U.S. PATENT DOCUMENTS

| | | | | |
|---|---|---|---|---|
| 6,173,434 | B1 * | 1/2001 | Wirthlin et al. | 716/116 |
| 6,298,377 | B1 * | 10/2001 | Hartikainen et al. | 709/223 |
| 6,397,225 | B1 * | 5/2002 | Brown et al. | 1/1 |
| 6,862,724 | B1 * | 3/2005 | Riley et al. | 326/39 |
| 7,181,355 | B2 * | 2/2007 | Kondo et al. | 702/84 |
| 7,627,455 | B2 * | 12/2009 | Lenz et al. | 702/183 |
| 2005/0246593 | A1 * | 11/2005 | Littrell | 714/48 |
| 2006/0085085 | A1 * | 4/2006 | Duemler | 700/19 |
| 2006/0200256 | A1 * | 9/2006 | Mason et al. | 700/65 |
| 2007/0019641 | A1 * | 1/2007 | Pai et al. | 370/389 |

FOREIGN PATENT DOCUMENTS

DE    202 80 020    1/2004

OTHER PUBLICATIONS

K. E. B. Hickman, The SSL Protocol, Internet Draft <draft-hickman-netscape-ssl-00.txt>, Apr. 1995 ("Hickman").*
"Programmable logic", Newton's Telecom Dictionary, 18th ed., Feb. 2002.*
"Cache", The Authoritative Dictionary of IEEE Standard Terms. 7th ed. 2000.*
Peterson et al. Computer Networks: A systems Approach. 3rd ed. "Frames, buffers, and Messages", pp. 142, (2003).*

* cited by examiner

*Primary Examiner* — Brendan Higa
(74) *Attorney, Agent, or Firm* — Michael J. Striker

(57) ABSTRACT

An interface makes it possible not only to link an automation system component in uniform fashion to a production management system but also to relieve the production management system. For this purpose a generic data server has a long-term data store integrated with the server, an integrated data analysis unit, and an integrated configuration means which is also usable for configuring the data analysis unit with respect to the analysis to be performed. The server relieves the production management system by performing preprocessing of data, and it simultaneously serves as a uniform interface between the production management system and the automation system component.

21 Claims, 7 Drawing Sheets

INTERFACE BETWEEN A PRODUCTION MANAGEMENT SYSTEM AND AN AUTOMATION SYSTEM

CROSS-REFERENCE TO RELATED APPLICATION

The invention described and claimed hereinbelow is also described in German Patent Application DE 10 2007 045 926.4 filed on Sep. 26, 2007. This German Patent Applications, whose subject matter is incorporated here by reference, provides the basis for a claim of priority of invention under 35 U.S.C. 119(a)-(d).

BACKGROUND OF THE INVENTION

The invention relates to an interface between a production management system (MES, for Manufacturing Execution System) and an automation system, and to a method for operating such an interface, in accordance with claims 1 and 15, respectively.

The predestined interface for exchanging information between software applications was known as Dynamic Data Exchange (DDE). Now, OPC has become established as the standardized interface for exchanging process data in PC-based automation technology. OPC is an application of Microsoft's DCOM (Distributed Component Object Model) technology. Compared to the DDE interface, the OPC-based data exchange is distinguished by significantly better performance. If an automation system is equipped with an OPC server, then secure communication with higher-order monitoring systems can be achieved as a result. Since in many automation system components there is no standardized communication interface, linking this communication interface to an MES by the user involves major programming effort, because the commands, furnished by the automation system component, for parametrizing the component have to be converted into a format that can be read and written by the MES. Alternatively, the MES vendor could simultaneously supply a component-specific link too. Then, however, the MES system is inflexible, and the automation system components cannot be replaced by components from other manufacturers except at major programming effort. For the manufacturer of the production management system as well, the effort and expense are higher, since the vendor has to ship different interface modules to his customers for different automation components.

German Utility Model DE 202 80 020 U1 discloses a welding tool with an OPC server and a data processing program for converting internal data from the welding tool from an internal data format to the OPC standard format and/or vice versa. The OPC server includes measurement/output means for acquiring internal data, and the OPC server is in communication with an OPC interface, and the OPC interface is located on a housing of the welding tool. The welding tool can be exchanged very easily for welding tools from other manufacturers who also use the OPC standard format. By means of the measurement/output means, the OPC server can acquire internal operating states of the welding tool, and by means of the OPC interface OPC can prepare them conformally and forward them, but the higher-order system (such as MES) is required for evaluating the data.

SUMMARY OF THE INVENTION

The object of the invention is to create an interface which not only enables a uniform linking of an automation system component to a production management system but also makes it possible to relieve the production management system in terms of its computation capacity.

This object is attained by means of an apparatus having a first interface, for linking a higher-order system, in particular a production management system, to the apparatus by means of a first data protocol, and having a second interface, for linking an automation system component to the apparatus by means of a second data protocol; a data acquisition means and a data transmission means are included and both means are connected to at least one of the interfaces, and both means are connected to one another in such a way that communication is capable of being implemented between the systems that are connectable to the interface, and a data conversion means is included which converts the protocols of both interfaces to one another, and the apparatus furthermore includes the following:

a) a long-term data store, integrated with the apparatus, for storing raw data acquired by means of the data acquisition means, in particular operating parameters of an automation system component that is connectable to the apparatus, and the apparatus automatically reads operating parameters of an automation system component, which is connectable to the apparatus, into the long-term data store by means of the second interface;

b) a data analysis unit, integrated with the apparatus, for analyzing the raw data stored in the long-term data store, and automatically, the data are read out of the long-term data store, and the analysis of the data is effected by means of the data analysis unit on the specification of an interchangeable data analysis instruction, and the preparation of the outcome of analysis is effected automatically for the further processing of the outcome;

c) a configuration means, integrated with the apparatus, for configuring the data analysis unit with regard to the analysis to be performed and for configuring the apparatus with regard to the manner of the further processing of the outcome of the data analysis by means of one of the interfaces or by means of the long-term data store.

The higher-order system could for instance include one of the following functions or could combine all the functions or parts of the following functions, for instance as an MES:

a) Production monitoring, for instance in the form of a control room;

b) Maintenance system with trend analysis function (Remote Condition Monitoring);

c) Quality monitoring;

d) Status administration system

The advantage of the embodiment according to the invention over the prior art mentioned at the outset is that by means of the long-term data store, changes in operating parameters of an automation system component connected to the apparatus can be jointly logged over a longer period of time. For long-term recordings in the sense of the invention, buffer stores can be provided for data quantities of up to 10 terabytes. By means of the data analysis unit, it is possible during or after the buffer storing to examine the data jointly logged by means of the second interface and from this to derive findings with respect to the state of the automation component. The results generated by the data analysis means can then be stored both in the long-term data store or buffer stored and also transmitted onward by means of one of the interfaces to a connected system, once they have been prepared in accordance with the data protocol to be used. As a result, a production management system, which typically takes on the task of data updating, is relieved with regard to the requisite computation power.

The apparatus thus serves both as an interface for exchanging between two systems that use different communication protocols and primarily also has the function of a monitoring entity, which monitors components connected to the apparatus, such as memory-programmable controls (SPS), numerical controls (NC), drive regulators, and motors, with regard to their operating state, analyzes their operating state, and informs the higher-order system of this operating state, optionally along with the outcome of analysis. In addition, by means of the second interface, operating parameters of an automation system component connected to the apparatus can be varied during ongoing operation and thus corrected "on the fly".

The long-term data store could furthermore serve as a data buffer for the data analysis unit; outcomes or intermediate outcomes of analysis can be stored in the long-term data store and read out again from the long-term data store and reprocessed by means of the data analysis unit.

By means of a higher-order system that is connectable to the first interface, the data from the long-term data store can be called up from that higher-order system; it would equally be conceivable to design the data storage as capable of being called up by an automation system component connected to the second interface.

With the apparatus according to the invention, long-term recording close to the machine of process and machine state data is possible. Because of the long-term recording that can be achieved, data can be made available for precise analysis of the cause of problems in machines, for optimizing products (such as components of a machine tool), and for optimizing process flows. Because of the evaluation algorithms that can be integrated with the apparatus of the invention, the user can concentrate on optimizing and analyzing machine performance and/or the production process and need not devote any thought to how he makes the data link with the machine and with higher-order systems. The preprocessing close to the machine reduces the amounts of data to be transmitted to higher-order systems, and because of the data buffer/data store, the possibility nevertheless exists, if needed by higher-order systems, of accessing the unfiltered data or "raw data" history of the machine for analysis purposes. By the combination of standardized communication, data stores and task-specific integration of preprocessing algorithms, a potential exists for optimizing and analyzing the machine performance and/or the production process.

Preferably, the apparatus of the invention includes a data analysis unit with at least one interchangeable function unit, by means of which the function of the data analysis unit can be defined and is variable at any time and which is administered by means of the configuration means. By means of the configuration means, the apparatus can thus modify the function of the data analysis means application-specifically and case-specifically by replacing the analysis algorithms for the operating parameters read into the long-term memory. Preferably, the function is implemented by means of a hardware and/or software plug-in (interchangeable hardware and/or software component). The hardware plug-in could be implemented for instance by means of an interchangeable storage medium, which on the basis of the user program stored in it defines the function of the data analysis unit and which can be activated by means of the configuration means. Another possibility would be to keep software modules in readiness, for instance by means of a memory included in the apparatus, or to read them in. Both for the hardware plug-in and the software plug-in, existing or special interfaces could be provided.

The principle of evaluation algorithms that are interchangeable by means of a framework or a configuration means offers the capability of using the apparatus of the invention for the most various tasks and to perform the evaluations close to the machine and machine-specifically, for instance by adapting the evaluation algorithms to the specific machine and its problems.

Advantageously, the data analysis unit has direct access to the data acquisition means and/or the data transmission means, and/or the data acquisition means has direct access to the data transmission means and the data analysis unit. Thus the data reception and analysis could be done in real time, bypassing the data buffer. It would also be appropriate if the data transmission means additionally has direct access to the long-term data store, so that the data can be read out by the memory or data acquisition means without intervening steps and prepared for being transmitted onward.

Especially preferably, the apparatus can be configured by means of the configuration means itself, but in particular, the following aspects are also configurable:

a) the writing operation and/or the data conversion for data that are to be sent by means of one of the interfaces;

b) the reading operation and/or the data conversion for data that are to be received by one of the interfaces;

c) the initialization of the apparatus itself by defining the functional scope, for instance, of the analysis means, and the course of measurement events at preconfigurable measurement points of an automation system component connected by means of the second interface;

d) the processing operation for internal data processing by means of the apparatus of the invention;

e) external events, which can occur in an automation system component and which accomplish the automatic reading in of data into the long-term data store.

Advantageously, a data protection device is included, by means of which securing of the data to be transmitted can be done by means of a secure data protocol. This can prevent the transmission of erroneous data and can prevent third parties who are using network connections that cannot be eavesdropped on from looking into the data.

Preferably, the first and/or the second interface operates by means of one of the following data protocols or can be configured for one of the following data protocols on the specification of the settings by means of the configuration means:

a) Web Service Standard Format OPC;

b) OPC-UA Standard Format;

c) Fieldbus Standard Format;

d) Proprietary Data Protocols.

In particular, the first interface uses the OPC-UA standard with XML data format or the Web Service standard as the first data protocol, and the second interface uses a Fieldbus standard or also the OPC-UA standard, although with a binary data format, as the second data protocol. The OPC UA standard with XML data format or the Web Service standard serves as a standardized interface for the production management system, and the OPC-UA standard with binary data format serves as a standardized interface for the automation system component. This configuration makes easy replacement of automation system components that are monitored by means of a production management system.

Advantageously, the apparatus is implemented in the form of a server, which functions as a standardized interface between a production monitoring system, embodied as a client, and an automation system component and in particular is implemented by means of a personal computer, which is linked to the higher-order system and to the automation system component by means of hardware interface cards. The apparatus can then be implemented on purely a software basis, using the hardware of a standard PC, which makes the embodiment economical and flexible.

A drive system with an apparatus according to the invention that is either integrated with the drive system or is external, in which the automation system component is a memory-programmable control (SPS) or a numerical control (CNC, NC) or a motion control or an electrical drive can easily be connected by means of the invention to a higher-order management system. Conversely, a machining system, in particular machine tools, with an integrated or external apparatus according to the invention, which apparatus is linked by means of the second interface to an automation system component that is part of the machining system, has the advantage that worn components can be replaced early, and if an error is found, the workers responsible for the machining system can be informed early of the cause of the error, before failure of the machining system occurs.

In a production management system with an integrated or external apparatus according to the invention, automation system components can easily be replaced.

When network-based drive systems or network-based production management systems are used, the aforementioned advantages extend to the entire system.

The invention is especially advantageous when many automation system components, for instance in the context of a production line, have to be administered and monitored, since by means of the invention this can be done in centralized or at least partly centralized fashion.

The drawings described below show exemplary embodiments for the apparatus of the invention that operate by the method of the invention. Not all the characteristics listed are always essential for the nucleus of the invention, and they can be replaced by equivalent characteristics of identical function.

DESCRIPTION OF THE PREFERRED EMBODIMENTS

Figure 1:
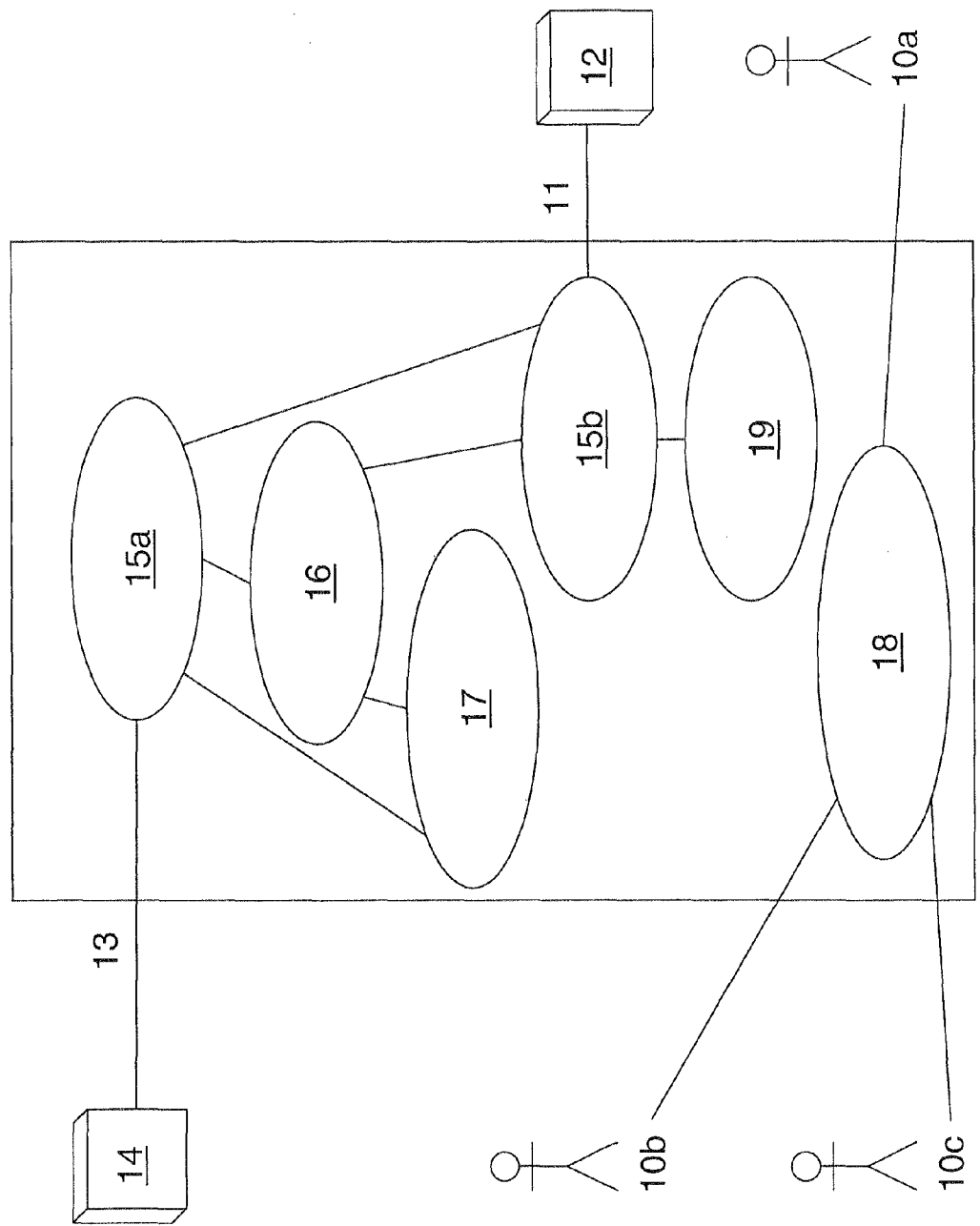
FIG. 1 shows the apparatus according to the invention with its internal workings.

In FIG. 1, the apparatus of the invention is shown in the form of a so-called generic, preferably PC-based data server (GDS). The GDS includes a first interface 11 for linking the production management system (MES) 12 to the GDS by means of the OPC-UA XML data protocol and a second interface 13 for linking the automation system component (such as SPS, NC, drive regulator) 14 to the GDS by means of the OPC-UA binary data protocol; a data acquisition means 15a and a data transmission means 15b are included, which are each connected to at least one of the interfaces 11, 13 and are additionally connected to one another in such a way that communication between the systems 12, 14 connectable to the interfaces 11, 13 can be implemented, and the GDS includes a data conversion means (not shown) which converts the protocols of the two interfaces into one another; in addition, a long-term data store 16 is integrated into the GDS, for storing raw data acquired by means of the data acquisition means 15a, in particular operating parameters of the automation system component 14. In addition, a data analysis unit 17 is integrated with the GDS, for analyzing the raw data stored in the long-term data store 16. A configuration means 18 is also included by the GDS; it serves to configure the data analysis unit 17 with regard to the analysis to be performed and for configuring the GDS itself, and in particular it serves the purpose of configuration with respect to the manner of further processing of the outcome of the data analysis, using one of the interfaces 11, 13 or by means of the long-term data store 16. The term "generic data server" (GDS) was selected because the server, with its internal structure always remaining the same, can be configured for the most various applications.

The MES administrator 10a or the machine manufacturer 10b or the machine operator 10c has the capability of configuring the internal components of the GDS for a specific application. This configuration can be done by means of a public network (such as the Internet) and/or a private network (such as an Intranet). The configuration by means of the MES administrator 10a pertains primarily to the linking of the MES system 12 to the GDS. To that end, by means of the configuration means 18 of the GDS, it selects a suitable data protocol (such as OPC-UA), by means of which the GDS will communicate with the MES 12 in future. The configuration of the machine manufacturer is primarily concentrated on the linking of the automation system component 14 (such as NC, SPS, motion control, robotics) to the GDS by means of a system-specific protocol, such as a fieldbus protocol or the OPC-UA binary protocol, which can be selected by means of the configuration means 18 of the GDS. After the configuration, the data acquisition means 15a is capable of acquiring data from the connected automation system component 14 by means of the interface 13 and by means of the data protocol of the automation system and storing these data in memory in the long-term data store 16 by means of a database or a data administration system. The data analysis unit 17 accesses the long-term data store 16 directly in order to process the data. The processing can be done for instance by the following:

Averaging and/or

Data compression and/or

Data filtering and/or

Spectral analysis.

All the data processing methods known in the prior art that are suitable for statistical purposes or other analyses of the data are conceivable. Special analysis methods implemented user-specifically could also be loaded into the data analysis unit 17 by means of a special interchangeable function module. The data analysis unit 17 can also directly (that is, not via the long-term data store 16) receive and process the data acquired by means of the data acquisition means 15a.

The data transmission means 15b is connected directly to the long-term data store 16 and to the data acquisition means 15a. Thus the data transmission means 15b has access to the components 15a, 16, 17 directly or indirectly. It is therefore possible for data, received both in the long-term data store 16 and from the data acquisition means 15a, and data analyzed by the data analysis unit 17, to be transmitted by means of the data transmission means 15b to the MES 12 by means of suitable protocols or data structures (such as Web Services, OPC-UA XML, and OPC-UA binary). The MES 12 thus communicates indirectly with the automation system component 14, by means of the internal structure 15a, 15b, 16, 17 of the GDS. In addition, the possibility exists of configuring the GDS by means of the configuration means 18 such that a data protection device 19 becomes active; it protects the data transfer and is suitable for allocating access rights, and different access rights can be allocated to different users 10a, 10b, 10c of the GDS and/or higher-order systems.

Figure 2:
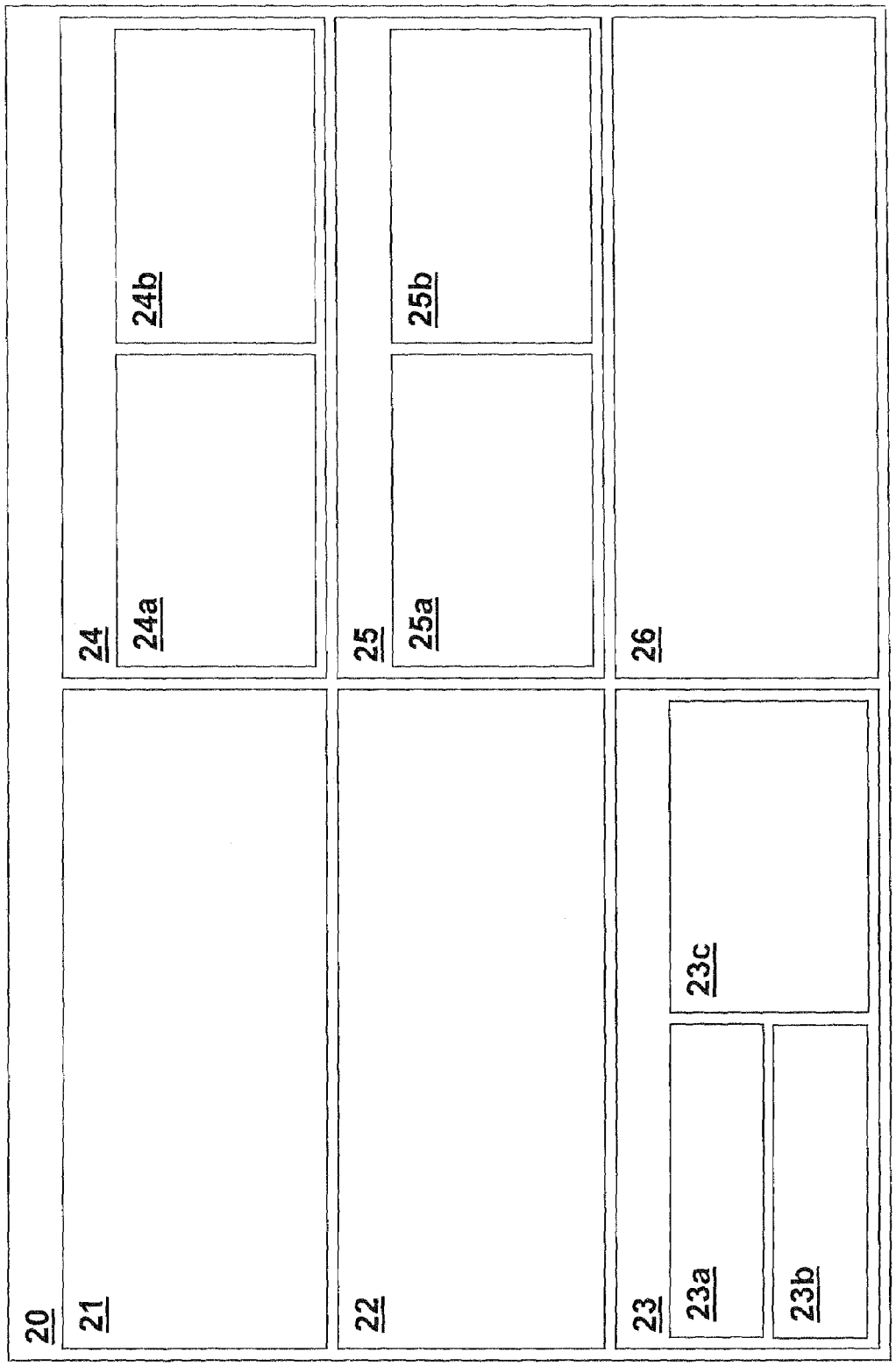
FIG. 2 shows the function modules required for operating the apparatus.

In FIG. 2, one embodiment of the GDS 20 is shown, with an integrated proxy function component 21 that has the task of ensuring communication connection between the GDS 20 and an external network (such as WAN, Internet, etc.). The GDS 20 furthermore includes a communication function component 22, by means of which the communication with a higher-order system is effected directly or indirectly by means of the proxy function component 21.

The data collection function component 23, integrated with the GDS 20, includes a means 23a for receiving data; a control program 23b; and a data storage means 23c.

The access monitor 24 integrated with the GDS 20 includes a component 24a for configuring a secure data transmission (for instance, choosing encoding algorithms, VPN, secure protocols) as a function of the linked local or external network. The access monitor 24 integrated with the GDS likewise includes a component 24b for configuring user rights, in order for instance to allocate and administer the access rights of users of the GDS 20.

The GDS 20 furthermore includes a configuration means 25 for basic configurations 25a and connection-specific configurations 25b for connections between the GDS and a higher-order system.

The following four configuration operations, among others, can be executed by the configuration means 25:

1. Putting the GDS into Operation (Server Set-Up):

In this operation, measurement points for detecting operating states of an automation component connected to the GDS can be defined, for instance by assigning SPS or NC variables, for instance, or inputs or outputs of an SPS (memory-programmable control) or NC (numerical control) to a customer-specific context. It is also possible to define data protocols for the GDS interfaces and to implement the linkage to systems connected to the GDS, for instance by allocating IP addresses. Finally, the server setup serves to link the automation components of processing centers to the GDS, in such a way that these components can be addressed by means of a standardized command, so that preferably a plurality of processing centers can be administered from the MES.

2. Configuration of a Measurement Operation:

For implementing this characteristic, the GDS includes a configuration means, such as a software browser, or an application that uses an existing Internet browser.

a) Select Measurement Point:

For this purpose, a previously defined measurement point is selected by means of the browser, and the measurement point is assigned so-called designators for unambiguous identification of the measurement point, so that access to the measurement point can be had later by means of the designator. It is thus possible to generate a list with designators by means of the browser and administer it and then by means of this list to access the measurement points indirectly.

b) Define Loading Time:

Next, how the measurement value is to be acquired is defined. The loading time for the measurement value is thus practically defined by the hardware of the automation system. The following selection options are available:

Cyclical loading;
Loading only upon a change in a measurement value;
Charging only if a limit value is exceeded;
Charging upon request by a higher-order system.

It is possible for these definitions to be made for individual measurement points or groups of measurement points.

c) Define Data Structure and Measurement Series:

A plurality of measurement points or designators can be grouped together. In addition, the following definitions can be made:

Conditions under which a message is sent to a higher-order system;
The addressees to whom a message will be sent;
Where measurement values are to be stored in memory;
The site in the memory where the data are to be stored (database or file structure);
Storage size (n values);
Storage principle (such as ring buffer);
Conditions under which the memory will be erased.

The data structure for a measurement series could also be integrated in the measurement point browser. On the basis of these provisions, the data structure of the measurement series is unambiguously defined.

3. Configuration of the Writing Operation:

a) Select Designator for Data Points:

By means of the browser, one or more of the data points to be described are assigned their own designators. The data points can be addressed by means of the designators. Data points can for instance be input units of automation components. It is also possible for already created designators for data points to be copied or stored in memory.

b) Define Downloading Time:

The time is also defined when the writing operation is effected, or in other words when the data points are described by means of the designators. For that purpose, it is necessary that the conditions for the writing operation be defined.

The following conditions could for instance be defined to effect a writing operation:

Writing on the basis of an outcome of analysis or calculation;
Writing upon manual request by the higher-order system;
Writing at certain system states (for instance, only in the event of maintenance).

These definitions are possible both for individual designators and for groups of designators.

c) Define Dependencies:

A plurality of designators can be grouped. In addition, the following definitions can be made:

The circumstances under which a message is to be sent;
The addressees to whom a message is to be sent;
Where measurement values are to be stored in memory;
The site in the memory where the data are to be stored (database or file structure);
Memory capacity (n values);
Memory principle (such as ring buffer);
Conditions under which the memory will be erased.

4. Configuration of a Processing Operation:

The GDS 20 known from FIG. 2 additionally includes a preprocessing unit for data. The term "preprocessing unit" has been selected since optimizing the communication between the GDS and MES, and thus relief of the MES, can be achieved by means of the preprocessing. The actual processing of the data on the order of a control room or process control, however, continues to be done by the MES, for instance.

The configuration of a processing operation can include the following steps:

a) Definition of the Processing Time:

First, a starting event is defined. The processing can be started cyclically at certain time intervals or at defined times, as a function of this starting event. Moreover, it can be defined under what circumstances the processing is to be started, such as:

Upon recurring events;
Upon request by the user;
Upon starting by a higher-order system;
If a measurement point assumes a certain value (such as a change of the mode of operation);
If the memory is occupied up to a certain size (for instance, if the memory is 90% full of data).

b) Definition of the Data Structure for the Measurement Data to be Prepared:

Here, measurement data can be grouped. It can be defined where in the GDS evaluation outcomes are to be stored in memory (database, file system), as well as whether or to which addressees a message about existing outcomes of computation are to be sent. The memory capacity (for instance, n data bytes in a ring buffer) can also be defined. Furthermore, it can be defined whether, together with the prepared data, an indication of the basis for the data used for the computation is to be stored in memory. For instance, it can be indicated where the input data for the computation originated and how they should be associated with the outcome. Moreover, information is available as to how many input values were used for the computation, from what period of time those input values originated, and whether they are still stored in the data memory or have already been deleted. Moreover, it can be defined whether and how the data structure for the for the prepared measurement values are integrated in the measurement point browser.

c) Definition of the Processing:

In a third step, the kind of data processing is defined, for instance by selection of a suitable algorithm, for instance for calculating a mean value, for calculating minimum or maximum values, or for executing a Fourier transform. Certain inputs and/or outputs of an automation system component connected to the GDS can be linked purposefully to an algorithm, so that different algorithms can be used for different operating parameters of the automation system component. It is also possible in the context of processing to validate the correct wiring, for instance with respect to the data types and data quantity, such as the minimum number of input values.

Figure 3A:
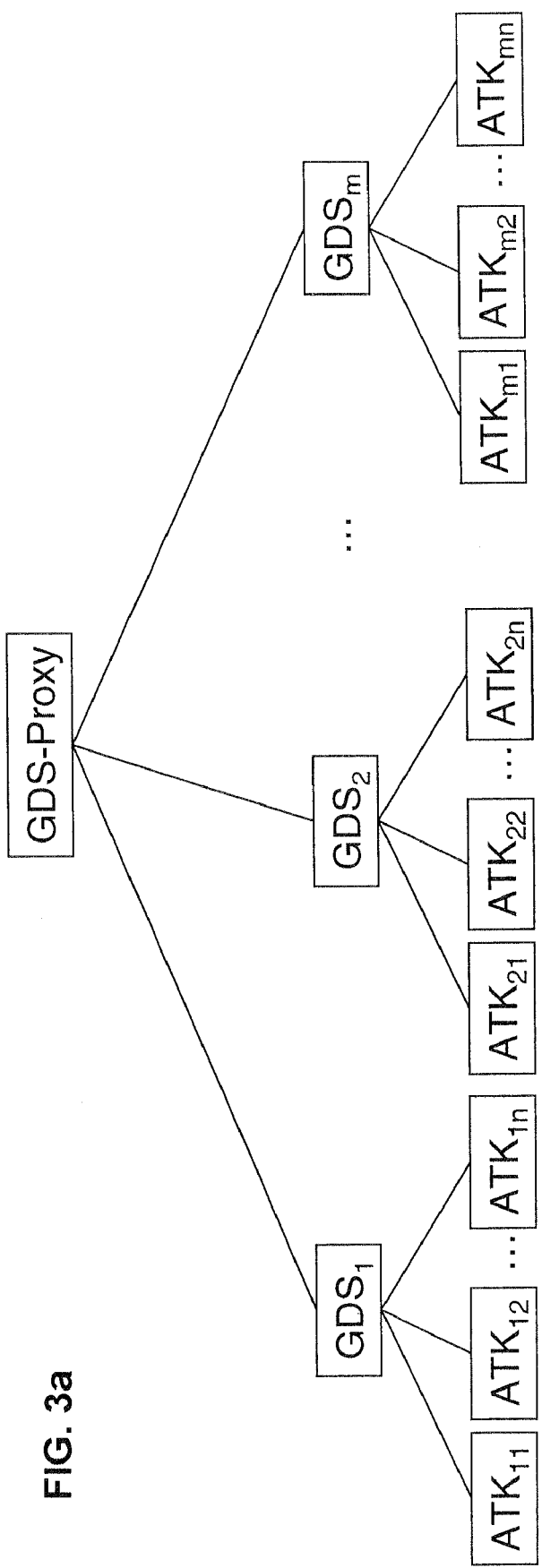
FIG. 3a shows a complex network structure having a plurality of apparatuses.

FIG. 3a shows a network with a plurality of GDSs. To each GDS1 through GDSm, a plurality of automation system components ATK11 through ATKmn can in turn be linked by means of a suitable data protocol (such as OPC-UA binary). The points between GDS2 and GDSm should make it clear that the network shown in FIG. 3 is theoretically expandable arbitrarily, and further GDSs could be inserted here. The components here are connected to one another in star form. All the GDSs are connected, by means of a transmission path, to a higher-order GDS proxy, and the GDS proxy makes the linking to a higher-order network possible.

Figure 3B:
FIG. 3b shows a simple network structure with one apparatus.

FIG. 3b shows the simplest form of implementation and in principle represents merely a single branch of the embodiment shown in FIG. 3a. Here, an automation system component ATK is shown, which communicates with the GDS by means of a secure data protocol, and the GDS in turn communicates with the GDS proxy.

For both FIG. 3a and FIG. 3b, it is true that the automation system component ATK can be flexibly connected to a higher-order MES by means of the embodiment shown here. The GDS proxy has the task of administering Internet addresses or network addresses and of connecting the local network having the generic data servers GDS1 through GDSm to the Internet.

Figure 4:
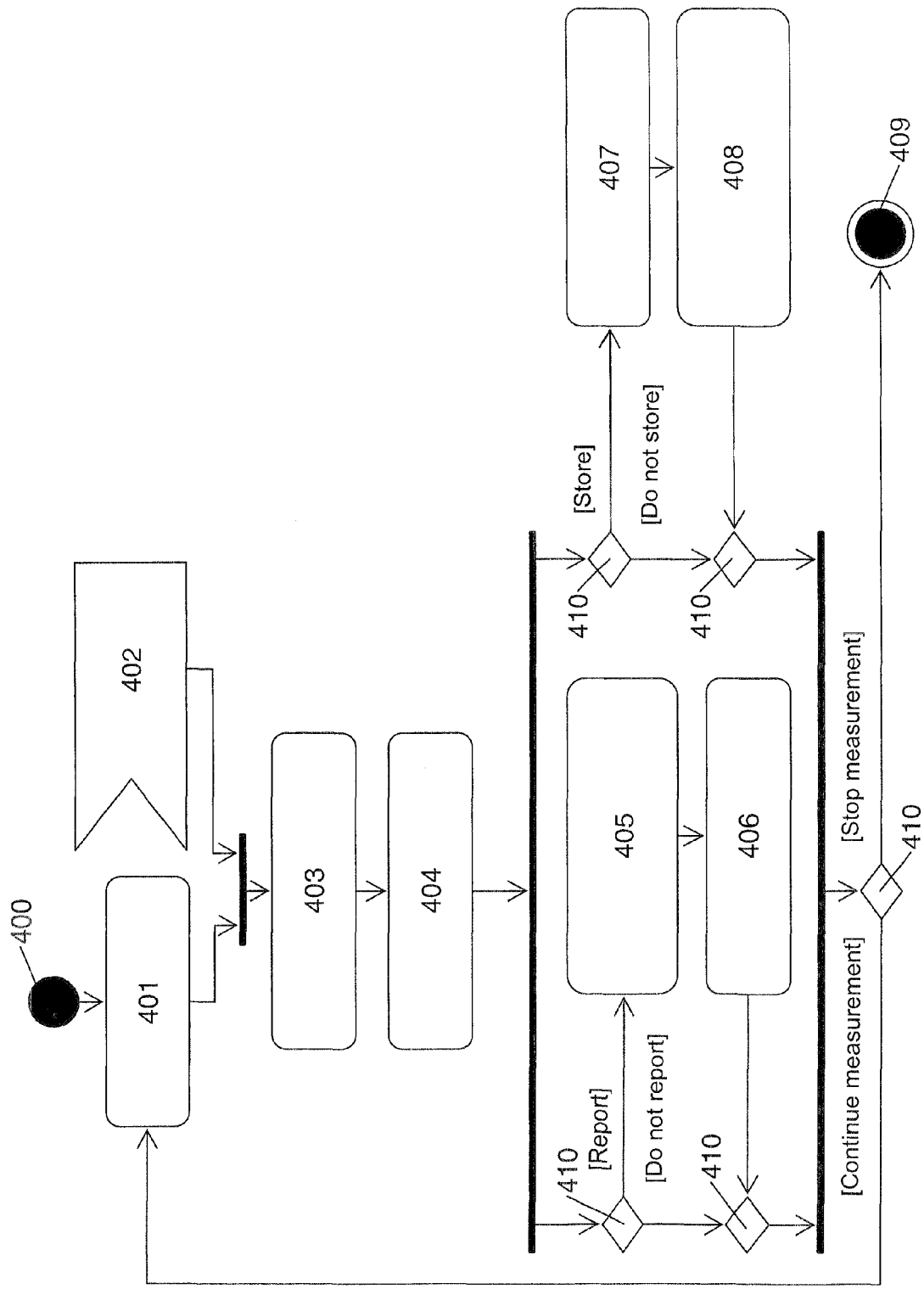
FIG. 4 shows the course of a measurement operation by means of the apparatus.

In FIG. 4, the monitoring of the automation system component (such as SPS, NC) by means of the GDS of the invention, and in particular the course of a measurement operation at the input/output unit of an automation system component (such as SPS, NC) using the GDS, is shown. As already explained in conjunction with FIG. 2, the GDS includes an integrated data receiving means 23a with a control program 23b. In each case, the components described in conjunction with FIG. 2 are referred to.

The control program 23b plays a central role in the course of the measurement operation. As soon as a change is made from a current operating state 400 of the GDS (such as an initial operating state: GDS started and configured) to the operating state of measurement data processing 401, the control program 23b waits for an external event 402. The external event 402 could for instance be a trailing or leading edge at an input/output unit of the automation system component and is configurable at the GDS. If the external event 402 occurs, then the control program 23b, in a next step 403, launches the reception of data, as a result of which the current value of a previously defined measurement point (input/output unit) is read in at the automation system component, in step 404.

The further course can then be as follows, by means of implemented jumps 410: The read-in measurement value is either relevant ("report"), for instance because it exceeds a predetermined threshold and has to be taken into consideration or stored in memory, or the read-in measurement value is not relevant ("do not report") and need not be taken into account or stored in memory. If the measured value must be taken into account, then it is prepared in step 405 for transfer to the higher-order system, by being integrated into a data protocol (such as OPC-UA XML) suitable for the first interface, and in step 406 it is forwarded to the higher-order system. Alternatively or in addition, the measurement value can be transferred to the data storage means 23c known from FIG. 2 and stored in memory there (407, 408).

Next, by means of a further branch 410, a decision is made as to whether further measurements will be effected ("continue measurement"), or the measurement is to be ended ("stop measurement"), so that a new operating mode 409 can be entered into (such as the "server stop" operating state, or "measurement data acquisition concluded").

Figure 5:
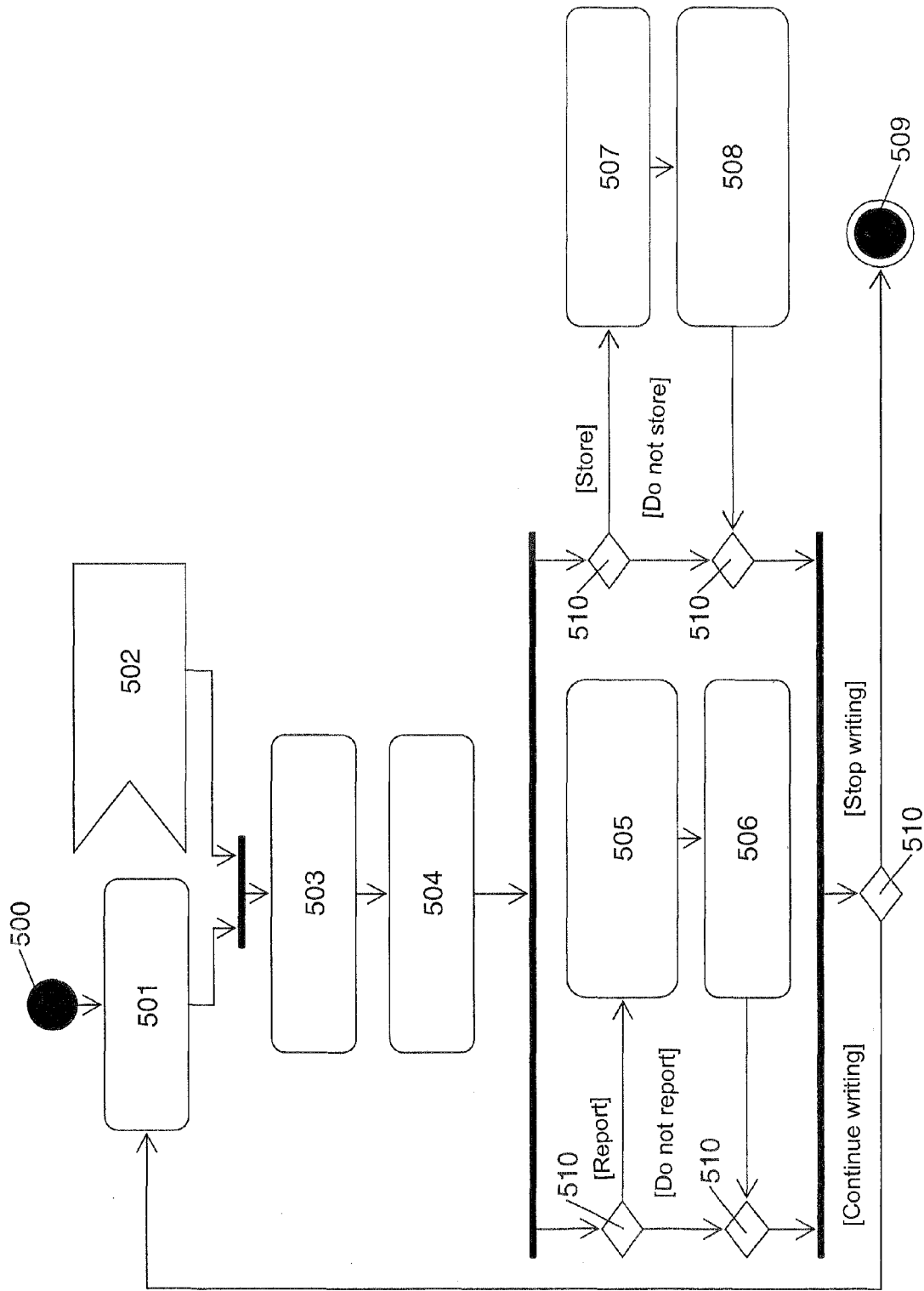
FIG. 5 shows the course of a writing operation by means of the apparatus.

In FIG. 5, the logical sequence for a writing operation initiated by means of the GDS is shown. As already mentioned in conjunction with FIG. 4, the GDS includes an integrated data collection means 23 with a data acquisition means 23a, a control program 23b, and a data store 23c. In this respect, see FIG. 2 and the associated explanation above.

As soon as the GDS changes from an arbitrary current operating state 500 (such as initial operating state; GDS started and configured) to the writing operating state 501, the control program 23b waits for an external event 502. The external event 502 could for instance be a set-point specification by a user of the higher-order system. Which external event 502 the control program 23b will react to, and how it will react, can be configured by means of the configuration means 25 of the GDS. If after the configuration the external event 502 occurs, then the control program 23b, in a next step 503, launches the reception of data by means of the data acquisition means 23a, as a result of which data are written to a data point in the GDS in the next step 504. The term data point is understood to mean for instance a process parameter or machine parameter whose set-point value can be varied.

The further sequence is now defined by means of logical decision points 510 implemented in the GDS (analogously see the explanations of reference numeral 410 in FIG. 1). These points in the final analysis determine whether and how the data will be further processed.

Following step 504, the program logic branches, in such a way that both one of the interfaces of the GDS (see FIG. 1 and its description) and the data store 23c (see FIG. 2 and its description) of the GDS can be used as data sinks.

In the context of the first branch, the data acquisition means 23a transfers the currently acquired data to one of the interfaces by means of step 505, if the data meet the necessary criteria. If step 505 has been executed, then the data are sent by means of the interface in a following step 506. The interface here could for instance be the first interface 11 of the GDS, to which an MES 12 is connected, and communication with the MES 12 is done for instance by means of an Internet protocol. After the data transfer, either the writing operation is ended and a transition is made to a different operating state 509 (for instance, operating state: "server is stopped"), or a jump is made back to step 501, so that the control program 23b continues as described above to wait for an event which has been defined by means of step 502.

If the data are to be stored in memory, then the data acquisition means 23a transfers the data by means of the second branch, in the context of program step 507, to the data buffer or data store 23c. By means of the decision points 510, a decision is made as to whether storing in memory (step 508) will be done or not.

After this program jump as well, once again either the writing operation can be ended and a transition made to a different operating state 509, or a jump is made back to step 501.

Figure 6:
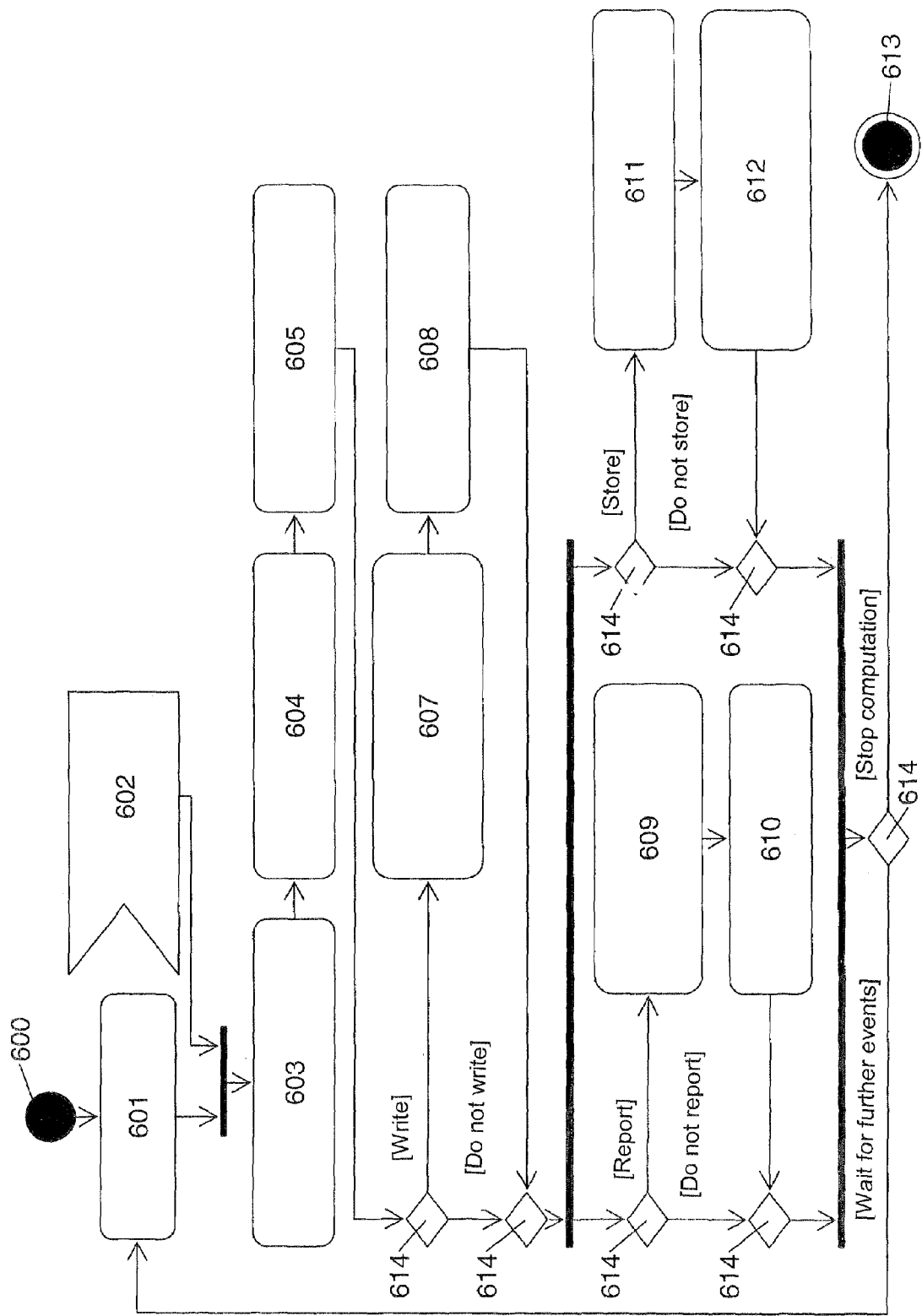
FIG. 6 shows the course of a processing operation by means of the apparatus.

In FIG. 6, the logical sequence is shown for a processing operation initiated by means of the GDS. In this respect, again see FIG. 2 and its description above.

As soon as the GDS changes from an arbitrary current operating state (such as initial operating state: GDS has been started and configured) 600 to the operating state 601, the control program of the processor waits for a defined external event 602. For instance, the user requests an evaluation of acquired measurement data, by means of which evaluation he can for instance ascertain the "reverse play" by the data processing unit 26, from the measurement data from a circle form test.

Which external event 602 the control program 23b reacts to, and how it reacts, can be configured by means of the GDS. If the external event 602 occurs after the configuration, then the control program 23b of the data collection function component 23, known from FIG. 2, launches the data preprocessing unit 26 in a first processing step 603.

The data preprocessing unit 26 reads out data from the data store 23c in a second processing step 604 and executes a data analysis or calculations, taking into account the data, in the context of a third processing step 605. The data computation unit 26 includes at least one interchangeable function unit, by means of which the algorithm for the data analysis can be defined. By means of the decision points 614, the further course is determined. If the data on which the analysis is based are to be written to a data point, then the data preprocessing unit 26, in the context of processing step 607, transfers the outcome of the computation to the data receiving means 23a known from FIG. 2, and then in the context of processing step 608, the actual operation of writing the data to the data point is initiated.

Following step 608, the program logic branches, in such a way that both one of the interfaces of the GDS (see FIG. 1 and its description) and the data store 23c (see FIG. 2 and its description) of the GDS can be used as data sinks.

In the context of the first branch, the data computation unit 26 transfers the currently acquired data to one of the interfaces by means of step 609. If step 609 has been executed, then the data are sent in a following step 610 by means of one of the interfaces of the GDS. The interface here could for instance be the first interface 11 of the GDS, to which an MES 12 is connected, and communication with the MES 12 is done for instance by means of an Internet protocol and the data are transferred by means of that protocol. After the data transfer, either the writing operation is ended and a transition is made to a different operating state 613 (for instance, operating state: "server is stopped"), or a jump is made back to step 601, so that the control program 23b continues as described above to wait for an event which has been defined by means of step 602.

If the data are to be stored in memory, then the preprocessing unit 26 transfers the data by means of the second branch, in the context of program step 611, to the data buffer or data store 23c and stores the data in step 612, as a function of the state of the decision point 614.

After this program branch as well, once again either the writing operation can be ended and a transition made to a different operating state 613, or a jump is made back to step 601, and an external event 602 is waited for.

Figure 7:
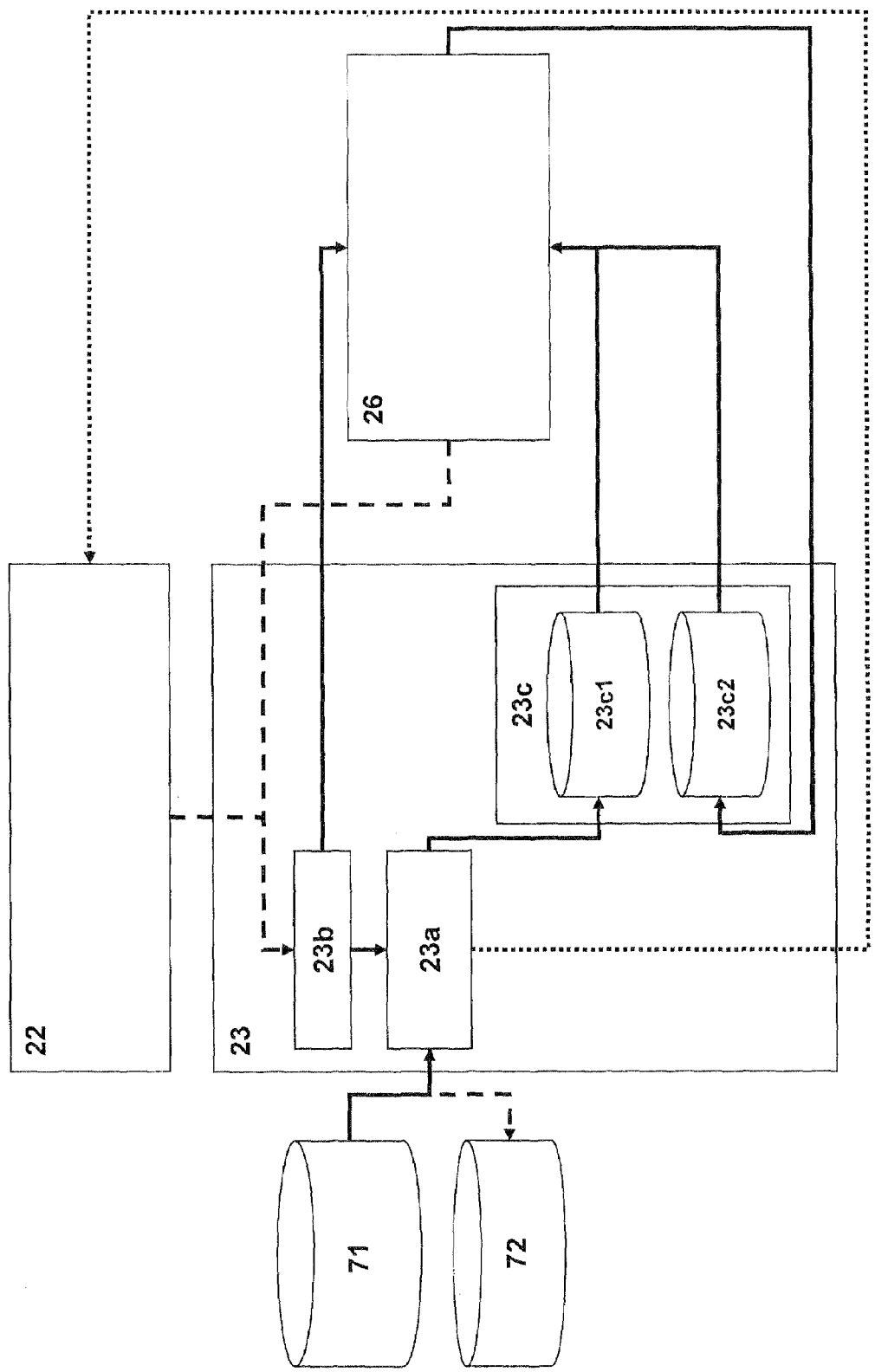
FIG. 7 shows interactions among the components of the apparatus.

FIG. 7 once again shows some components already known from the description of FIG. 2 and a mutual interaction during the operation of the GDS, in particular during the program sequences shown in FIGS. 4 through 6 and described above. The reference numerals known from FIG. 2 have been used once again here. In addition, measurement points/monitor data 71 and describable data points 72 are shown.

The communication function component 22 includes communication interfaces (Web Services, OPC-UA XML, OPC-UA binary), to which the data acquisition means 23a of the data collection function component 23 has access, so that data from the data acquisition means 23a can be transmitted by means of the control program 23b from the preprocessing unit 26 to the communication interfaces of the communication component 22. Conversely, the communication component 22 can also forward data, transmitted to the server from the external periphery by means of the communication interfaces, to the data acquisition means 23a indirectly by means of the control program 23b.

The data store 23c can include both structured measurement series 23c1 and prepared measurement data 23c2. The data for storing structured measurement series in memory are received by the data store 23c from the data acquisition means 23a, and the preprocessing unit 26 can read out these measurement series.

Prepared measurement data are received by the data store 23c, for instance from the preprocessing unit 26. The data store 23c virtually serves as a buffer store or memory for intermediate events, and the preprocessing unit 26 here can both store these intermediate events in memory and read them out again.

The data acquisition means 23a can read in data from the measurement points 71 either once and for all or regularly (monitor mode) and describe data points 72 once and for all or regularly. The data acquisition means 23a has access to the data store 23c, and in particular to the memory region 23c1, for storing structured measurement series in memory.

Depending on the mode of operation (initializing, configuring, measurement/reading, writing, processing), some of the above-described steps and data transfers can be executed simultaneously or sequentially by the GDS.

It will be understood that each of the elements described above, or two or more together, may also find a useful application in other types of constructions and methods differing from the types described above.

While the invention has been illustrated and described as embodied in an interface between a production management system and an automation system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus comprising:
    a first interface for linking a higher-order system to the apparatus by a first data protocol;
    a second interface for linking an automation system component to the apparatus by a second data protocol;
    a data acquisition circuit and a data transmission circuit that are each connected both to at least one of the interfaces and to one another in such a way that communication is implementable between the systems that are connectable to the interfaces;
    a data conversion circuit which converts the first and second data protocols with input/output data of both interfaces to one another;
    a long-term data store integrated with the apparatus, for storing raw data acquired by the data acquisition circuit;
    a data analysis processor integrated with the apparatus for processing and analyzing the raw data stored in the long-term data store by data processing methods of averaging and/or data compression and/or data filtering and/or spectral analysis;
    a configuration processor integrated with the apparatus, for configuring the data analysis processor with a portion of computer-readable code stored in a non-transitory computer-readable medium with regard to an analysis to be performed and further processing an outcome of the data analysis by one of the interfaces or by the long-term data store,
    wherein the data acquisition circuit operates a control program which, upon occurrence of an external and configurable event, launches a data reception process including reading in a current value of a previously defined measurement point,
    wherein the data transmission circuit transmits data received both in the long-term data store and from the data acquisition circuit and data analyzed by the data analysis processor to the higher order system with suitable protocols or data structures,
    wherein the data analysis processor includes at least one interchangeable function, by which an algorithm for the data analysis processor is definable and variable at any time and which is administered by the configuration circuit; and
    wherein different algorithms are used for different operating parameters of the automation system component, and
    wherein the algorithm of the data analysis processor is modified application-specifically and case specifically by replacing the analysis algorithms for the respective operating parameters rendering the apparatus configurable by the configuration processor through one of the interfaces.

2. The apparatus as defined by claim 1, wherein the long-term data store integrated with the apparatus is provided for storing the data acquired by the data acquisition circuit, which data are operating parameters of an automation system component that is connectable to the apparatus.

3. The apparatus as defined by claim 1, wherein the data acquisition circuit has direct access to the data analysis processor.

4. The apparatus as defined by claim 1, wherein the data transmission circuit has direct access to the long-term data store.

5. The apparatus as defined by claim 1, wherein the apparatus is configured so that by the configuration processor a reading process is configurable by one of the interfaces and/or an initialization of the apparatus and/or a course of measurement operations is configurable using at least one of the interfaces.

6. The apparatus as defined by claim 5, wherein the configuration processor is formed to configure a writing process.

7. The apparatus as defined by claim 1, further comprising a data protection device by which securing of the data to be transmitted is implementable by a data protocol, and/or according to access rights of which to individual components and/or to data stored in the apparatus are allocatable.

8. The apparatus as defined by claim 1, wherein the first and/or the second interface are configured to operate by a protocol selected from the group consisting of:
    a) Web Service Standard Format OPC;
    b) OPC-UA Standard Format;
    c) Fieldbus Standard Format;
    d) Proprietary Data Protocols.

9. The apparatus as defined by claim 1, wherein the apparatus is implemented as a server which functions as a standardized interface between a higher-order system embodied as a client, and an automation system component and is implemented in particular by a personal computer, which is linked to the higher-order system and to the automation system component by hardware-interface cards.

10. The apparatus as defined by claim 9, wherein the apparatus is implemented as the server which functions as the standardized interface between the high-order system embodied as the client, which is a production monitoring system.

11. A drive system with the apparatus as defined by claim 1, wherein the automation system component is a component selected from the group consisting of a memory-programmable control, a numerical control, a motion control, an electrical drive and a combination thereof.

12. A machining system, comprising the apparatus as defined by claim 1, wherein the automation system component linked by the second interface is part of the machining system.

13. The machining system as defined by claim 12, wherein the machining system is configured as a machine tool.

14. A production management system, comprising the apparatus as defined by claim 1.

15. A network-based drive system, comprising the apparatus as defined by claim 1.

16. A network-based production management system, comprising the apparatus as defined by claim 1.

17. A production line, comprising the apparatus as defined by claim 1.

18. A computer-implemented method for linking, via a second interface, an automation system component to a production management system via a first interface, comprising the steps of:
   a) using a processor, connected to the second interface and operating a control program, to automatically read-in data including an operating parameter of the automation system component and storing the operating parameter in a long-term data store upon detection of an external event by the control program, which external event is configurable by a configuration processor;
   b) automatically reading out the operating parameter from the long-term data store by a data analyzing code that includes an interchangeable function unit processing and analyzing the operating parameter in accordance with a specification of an interchangeable algorithm using one or more data processing methods selected from a group consisting of averaging, data compression, data filtering and spectral analysis, and automatically preparing an outcome of said analyzing for further processing of the outcome;
   c) automatically further processing the outcome of said analyzing by the first interface and/or by the second interface and/or by the long-term data store;
   d) configuring the interchangeable algorithm by an interchangeable function process at any time, wherein different algorithms are used for different operating parameters of the automation system component and at least one algorithm of the data analysis code is modified application-specifically and case specifically by replacing the analysis algorithm for the operating parameters;
   e) configuring the apparatus by one of the interfaces; and
   f) using a data transmission means, transmitting data received both in the long-term data store and from the processor and data analyzed by the data analysis code to the higher-order system, using suitable protocols or data structure, via the first interface.

19. The method as defined by claim 18, wherein the data includes second interface operating parameters of the automation system component and wherein said second interface operating parameters are varied.

20. The method as defined by claim 18, wherein the analyzing includes writing of outcomes of analysis into the long-term data store, and wherein these outcomes of analysis are read out from the long-term data store and re-analyzed.

21. The method as defined by claim 18, further comprising the production management system calling up one of interfaces data stored in the long-term data store.

* * * * *